United States Patent [19]
Malone

[11] Patent Number: 5,832,648
[45] Date of Patent: Nov. 10, 1998

[54] SCENT DISPENSER

[76] Inventor: Richard E. Malone, R.D. #4, Box 708, New Castle, Pa. 16101

[21] Appl. No.: 879,884

[22] Filed: Jun. 20, 1997

[51] Int. Cl.$^6$ ................................................ A01K 23/00
[52] U.S. Cl. ..................................... 43/1; 239/44; 239/47
[58] Field of Search ............................. 43/1; 239/44, 47, 239/49, 50, 45, 46, 51

[56] References Cited

U.S. PATENT DOCUMENTS

| | | | |
|---|---|---|---|
| D. 268,695 | 4/1983 | Koll | D22/99 |
| D. 301,912 | 6/1989 | Ward | D22/125 |
| 2,452,424 | 10/1948 | Bell . | |
| 2,474,607 | 6/1949 | Wheeler . | |
| 2,503,331 | 4/1950 | Gosheff . | |
| 2,573,672 | 10/1951 | Reinhardt . | |
| 2,609,230 | 9/1952 | Raleigh . | |
| 2,616,759 | 11/1952 | Walsh . | |
| 3,207,441 | 9/1965 | Schreiber . | |
| 5,307,584 | 5/1994 | Jarvis | 43/1 |
| 5,327,667 | 7/1994 | Fore | 43/1 |
| 5,369,903 | 12/1994 | Cox | 43/1 |
| 5,622,314 | 4/1997 | Eason . | |

*Primary Examiner*—Jack W. Lavinder
*Attorney, Agent, or Firm*—David L. Volk

[57] ABSTRACT

A container forms a shoulder disposed annularly about an opening in the container. The container contains a scented liquid therein. A cap is configured to removably cover the opening. The cap includes a ring thereon for tying a cord thereto, for hanging the cap from a tree branch. A plurality of elongated members are attached to the cap. Each of the elongated members includes a catch member at a distal end thereof and disposed outward from the elongated member. Each of the catch members is configured to retain the container thereon by seating beneath the shoulder, thus the container is suspendable below the cap when the cap is removed from the opening. A flexible, planar member forms a base of the cap. The planar member includes a slot formed therein. The slot is configured to snugly retain an end of an elongated wick therein. The cap may be removed from the container and the container suspended below the cap, with the end of the wick retained by the planar member above the container, and the wick extending downward into the scented liquid. In this configuration, the scented liquid is dispersable into air when air currents flow over the wick.

2 Claims, 3 Drawing Sheets

SCENT DISPENSER

BACKGROUND OF THE INVENTION

1. Field of the Invention

The present invention relates to dispensers, particularly to a liquid scent dispenser for use by hunters.

2. Description of the Related Art

Hunters often use scented liquids to attract game. The scented liquid is commonly dispersed on the hunter's clothing. Because hunters' scents are commonly quite offensive to smell, this practice makes the clothing offensive to smell.

A scent dispenser which can effectively disperse scent, without affecting a hunter's clothing, would provide a welcome benefit to hunters and their families.

SUMMARY OF THE INVENTION

The scent dispenser of the present invention includes a container having an opening therein. The container forms a shoulder disposed annularly about the opening. The container contains a scented liquid therein. A cap is configured to removably cover the opening. The cap includes a ring thereon for tying a cord thereto, for hanging the cap from a tree branch. A plurality of elongated members are attached to the cap. Each of the elongated members includes a catch member at a distal end thereof and disposed outward from the elongated member. Each of the catch members is configured to retain the container thereon by seating beneath the shoulder, thus the container is suspendable below the cap when the cap is removed from the opening. A flexible, planar member forms a base of the cap. The planar member includes a slot formed therein. The slot is configured to snugly retain an end of an elongated wick therein. The cap may be removed from the container and the container suspended below the cap, with the end of the wick retained by the planar member above the container, and the wick extending downward into the scented liquid. In this configuration, the scented liquid is dispersable into air when air currents flow over the wick.

DETAILED DESCRIPTION

Figure 1:
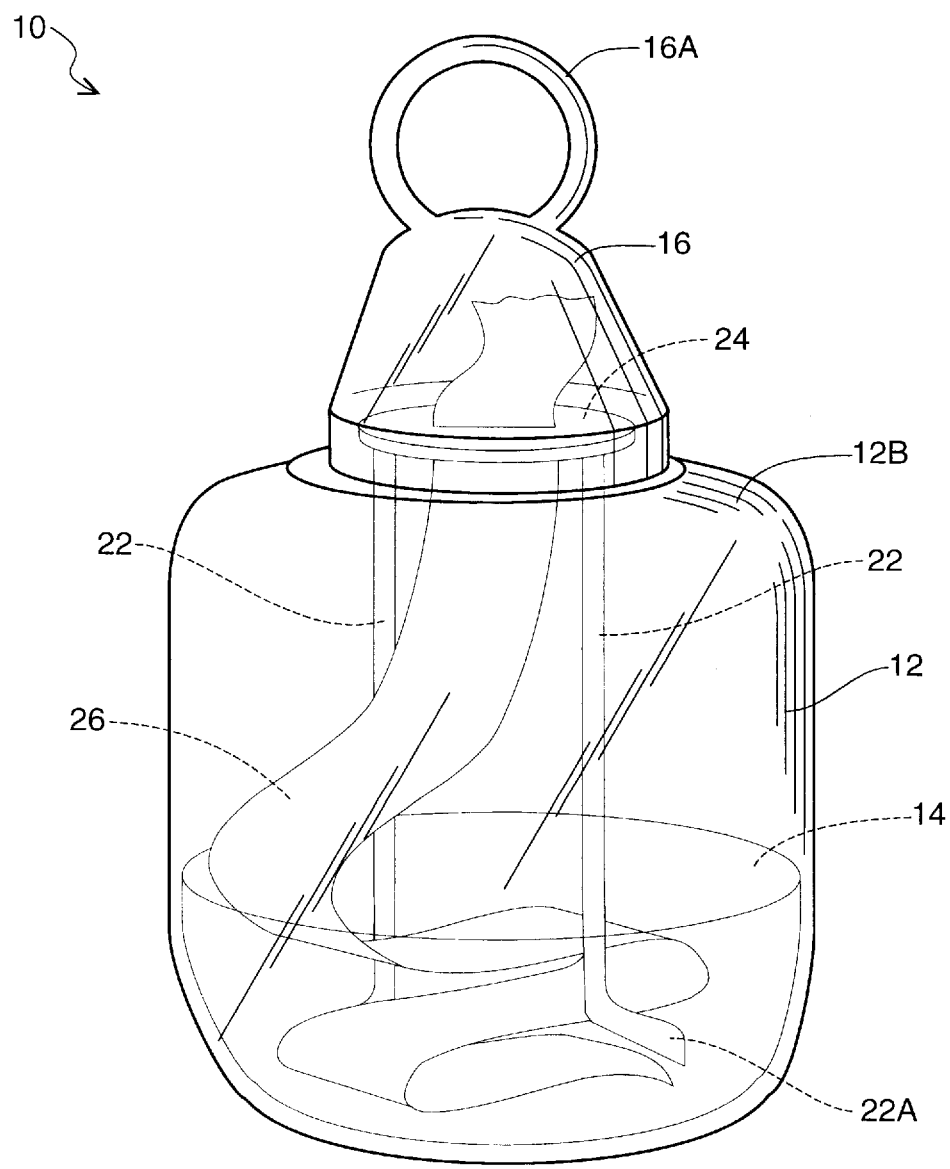
FIG. 1 is a perspective view of the scent dispenser of the present invention.
Figure 2:
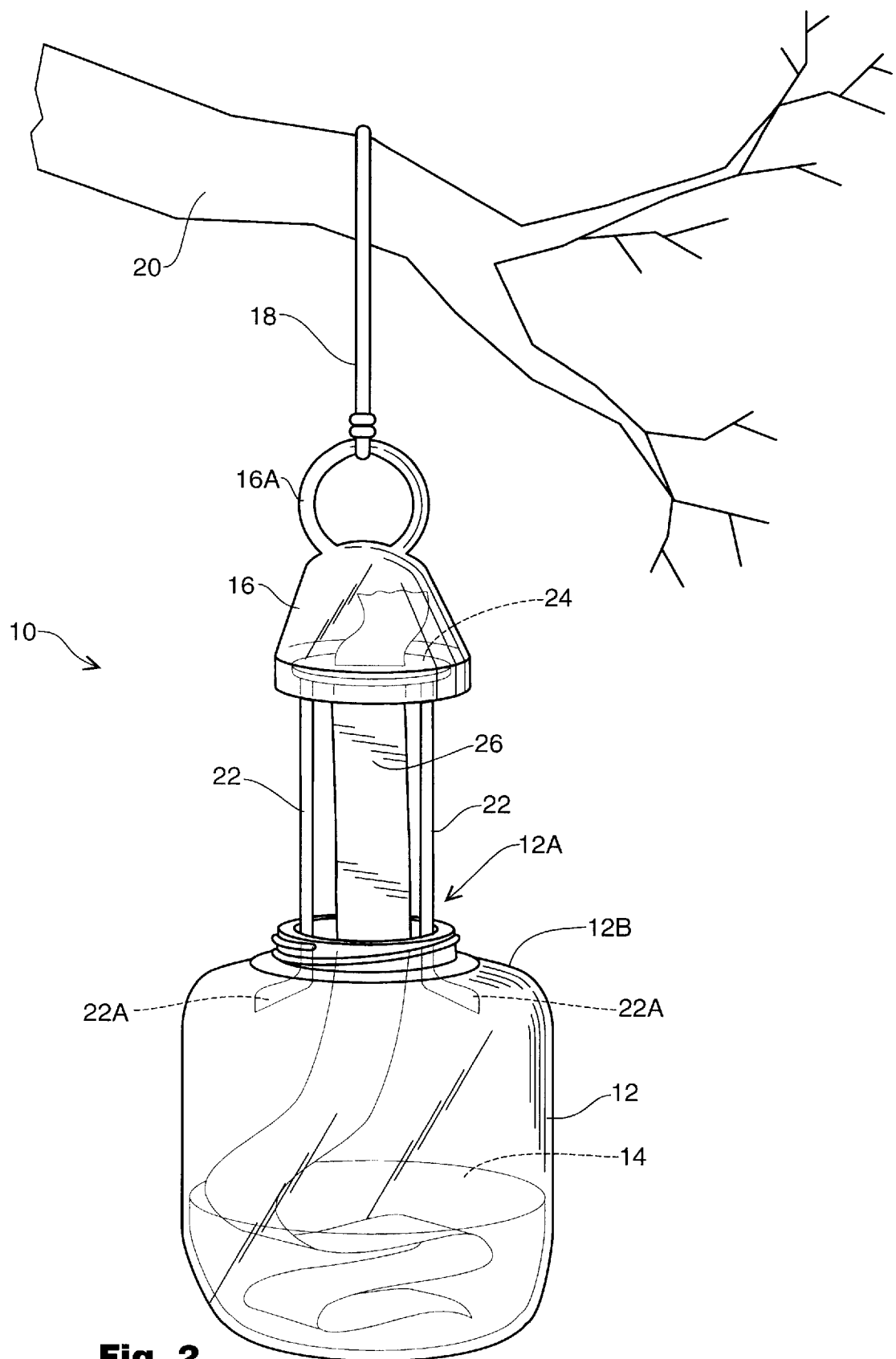
FIG. 2 is a perspective view of the scent dispenser in use.

FIG. 1 is a perspective view of a scent dispenser 10 of the present invention. FIG. 2 is a perspective view of the scent dispenser 10 in use. Referring to FIGS. 1 and 2, the scent dispenser 10 includes a container 12 having an opening 12A therein. The container 12 forms a shoulder 12B disposed annularly about the opening 12A. The container 12 contains a scented liquid 14 therein. A cap 16 is configured to removably cover the opening 12A. In the embodiment shown, this is accomplished by threads on the cap 16 and the opening 12A. The cap 16 includes a ring 16A thereon for tying a cord 18 thereto, for hanging the cap 16 from a tree branch 20. Instead of the ring 16A, any suitable hanging means may be used.

Figure 3:
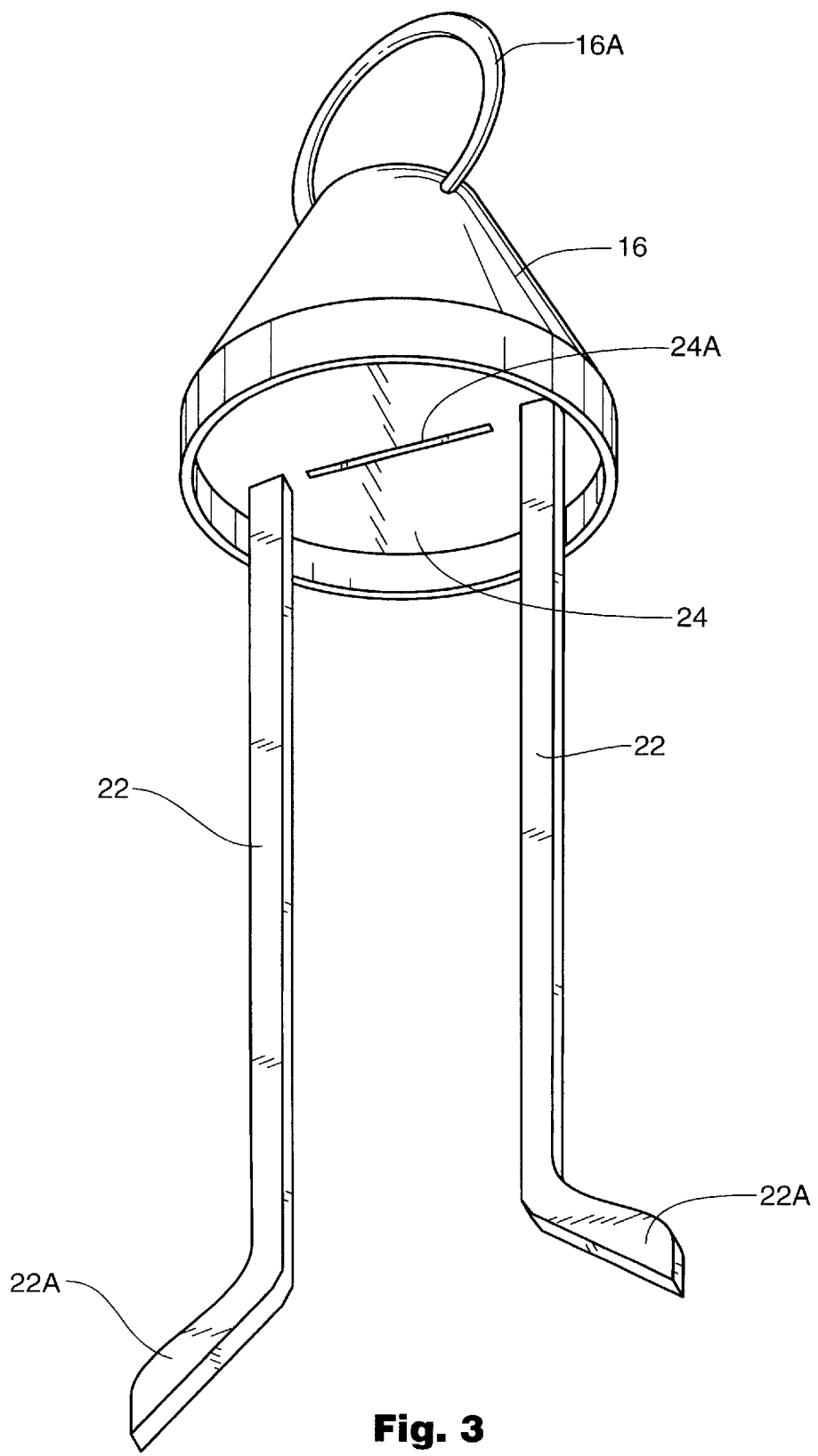
FIG. 3 is a bottom perspective view of the cap, shown without the container for clarity.

FIG. 3 is a bottom perspective view of the cap 16, shown without the container 12 for clarity. Referring to FIGS. 2 and 3, a plurality of elongated members 22 are attached to the cap 16. Each of the elongated members 22 includes a catch member 22A at a distal end thereof and disposed outward from the elongated member 22. Each of the catch members 22A is configured to retain the container 12 thereon by seating beneath the shoulder 12B, thus the container 12 is suspendable below the cap 16 when the cap 16 is removed from the opening 12A, as shown in FIG. 2.

A flexible, planar member 24 forms a base of the cap 16. The planar member 24 includes a slot 24A formed therein. The slot 24A is configured to snugly retain an end of an elongated wick 26 therein. The planar member 24 is flexible to enable insertion of the wick 26 through the slot 24A. A rigid member (not shown) may be used to urge the wick 26 through the slot 24A, the slot 24A widening as the planar member 24 flexes inwardly from the urging of the rigid member. Once the wick 26 is inserted, the rigid member is removed, and the planar member 24 flexes back outward, the slot 24A narrowing to firmly grab the wick 26.

The present invention may be conveniently carried with the cap 16 securely covering the opening 12A, and the scented liquid 14 contained therein. The container 12 may be any desired shape, such as a flask to fit in the hunter's pocket. When desired for use, the cap 16 may be removed from the container 12 and the container 12 suspended below the cap 16. The cap 16 may be tied to a tree branch or other location. An end of the wick 26 is retained by the planar member 24, above the container 12, and the wick 26 extends downward into the scented liquid 14. In this configuration, the scented liquid 14 is dispersable into air when air currents flow over the wick 26.

The foregoing description is included to describe embodiments of the present invention which include the preferred embodiment, and is not meant to limit the scope of the invention. From the foregoing description, many variations will be apparent to those skilled in the art that would be encompassed by the spirit and scope of the invention, including but not limited to the following:

a. the elongated members may be replaced with any suitable suspending means, such as a single cylindrical screen having an outwardly turned distal end configured to seat beneath the shoulder of the container; and b. the planar member and the slot may be replaced with any suitable wick retaining means for retaining the end of the wick above the container when the container is suspended below the cap.

Accordingly, the scope of the invention is to be limited only by the following claims and their legal equivalents.

The invention claimed is:

1. A scent dispenser comprising:

a. a container having an opening;

b. the container forming a shoulder disposed annularly about the opening;

c. the container containing a scented liquid therein;

d. a cap configured to removably cover the opening;

e. the cap having a ring thereon for tying a cord thereto, for hanging the cap from a tree branch;

f. a plurality of elongated members attached to the cap, each of the elongated members having a catch member at a distal end thereof and disposed outward from the elongated member, each of the catch members configured to retain the container thereon by seating beneath the shoulder, wherein the container is suspendable below the cap when the cap is removed from the opening;

g. an elongated wick; and h. a flexible, planar member forming a base of the cap, the planar member including a slot formed therein, the slot configured to snugly retain an end of the wick therein;

i. whereby the cap may be removed from the container and the container suspended below the cap, with the end of the wick retained by the planar member above the container, and the wick extending downward into the scented liquid, the scented liquid thereby being dispersable into air when air currents flow over the wick.

2. A scent dispenser comprising:

a. a container having an opening;

b. the container forming a shoulder disposed annularly about the opening;

c. a cap configured to removably cover the opening;

d. a pair of container support members extending outwardly from the cap;

e. each of the container support members comprising a straight leg depending outwardly from the cap, and a foot depending outwardly from the leg at a distal end of the leg, such that the leg and the foot together generally resemble a hockey stick;

f. each of the feet configured to retain the container thereon by seating beneath the shoulder; and g. a wick retaining means adapted to retain one end of an elongated wick above the opening of the container when the container is suspended below the cap.

* * * * *